(No Model.)
T. GORDON.
GAS REGULATOR.
No. 562,131. Patented June 16, 1896.
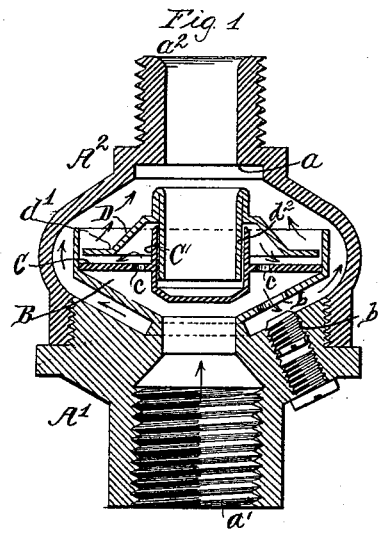
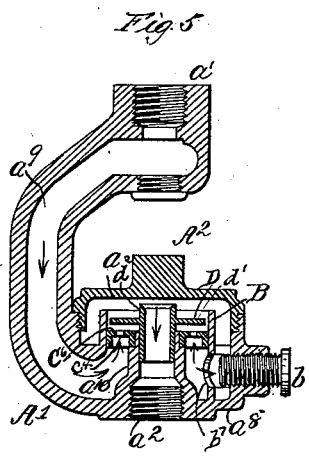
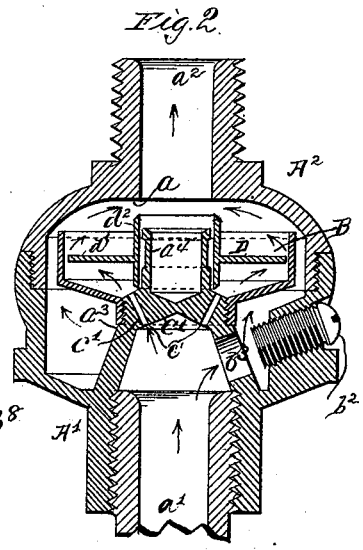
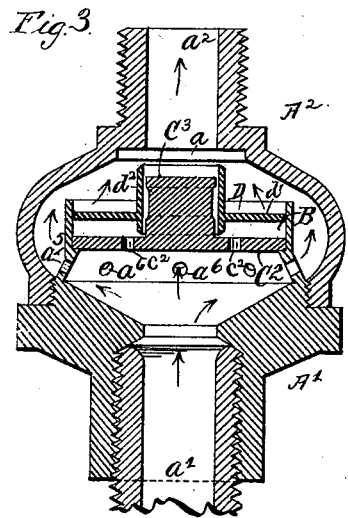
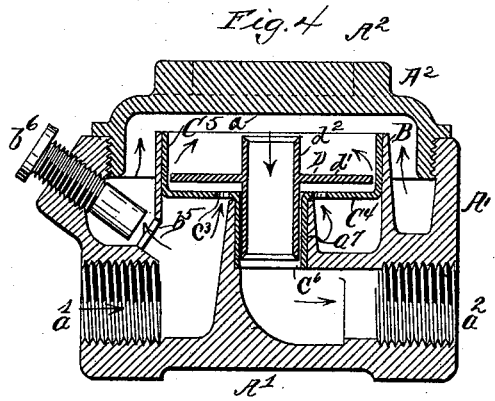
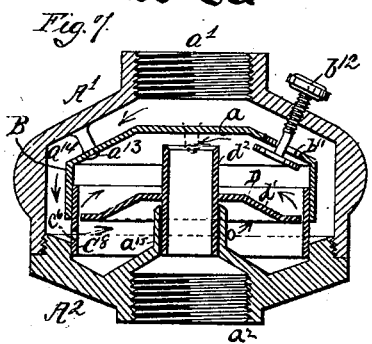
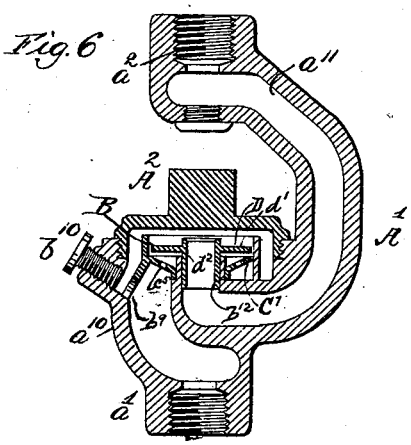
Witnesses
C. R. Ferguson
W. M. Iliff
Inventor
Thomas Gordon
By his Attorney
Edwin H. Brown

UNITED STATES PATENT OFFICE.

THOMAS GORDON, OF NEW YORK, N. Y.

GAS-REGULATOR.

SPECIFICATION forming part of Letters Patent No. 562,131, dated June 16, 1896.

Application filed January 5, 1892. Serial No. 417,058. (No model.)

*To all whom it may concern:*

Be it known that I, THOMAS GORDON, of New York, in the county and State of New York, have invented a certain new and useful Improvement in Gas-Regulators, of which the following is a specification.

My present improvement relates to fluid-regulators of that type wherein a float-valve is poised in a moving column of the fluid for the purpose of procuring an automatic delivery of a constant quantity in a given time. Regulators of this class are, so far as I know, always liable to cause "fluttering," owing to rapid up-and-down movements which the float will sometimes have. These movements occur from various causes, as, for instance, from a variation of pressure originated by a sudden jarring of the fluid in the pipe leading to the regulator. The fluctuations originating in this way are apt to continue until some change occurs in the pressure. An expedient commonly resorted to for avoiding fluttering is the throttling of the supply-pipe or delivery-pipe, or some passage or passages in the regulator above the float. An obstruction thus produced interferes with the best operations of the regulator at low pressure.

My improvement is based upon the theory that in order to attain the best results it is important to have the supply and delivery pipes absolutely free and unobstructed, and also to have the fluid which passes the outer edge of the float to flow freely to the exit of the regulator or to the valve controlling said exit, the object being to obviate any throttling except that which is produced by the automatic action of the float and the valve which is operated thereby.

I will describe a regulator embodying my improvement, and then point out the novel features in a claim.

In the accompanying drawings, Figure 1 is a central vertical section of a regulator embodying my improvement. Fig. 2 is a central vertical section of a regulator of modified form embodying the improvement. Fig. 3 is a central vertical section of a regulator of modified form embodying the improvement. Fig. 4 is a central vertical section of a regulator of modified form embodying the improvement. Fig. 5 is a central vertical section of a regulator of modified form embodying the improvement. Fig. 6 is a central vertical section of a regulator of modified form embodying the improvement. Fig. 7 is a central vertical section of a regulator of modified form embodying the improvement.

The regulator shown in Fig. 1 is intended for an upward current. The body of this regulator consists of two parts $A'$ $A^2$, which are united in any suitable manner—as, for instance, by screw-threads. The lower part $A'$ is provided with an inlet $a'$ and the upper part with an outlet $a^2$. The inlet $a'$ is shown as being internally screw-threaded to provide for securing it to a supply-pipe, and the outlet $a^2$ is represented as provided with an external screw-thread for engagement with a delivery-pipe. B designates a chamber of general supply. As here shown, it is formed integral with the lower part $A'$ of the body of the regulator and extends upwardly and outwardly from the inlet $a'$ thereof. At its upper extremity it has a cylindric portion. Within the chamber B is a diaphragm C, which, as here shown, is arranged in the bottom of the cylindric portion of such chamber. It has a central opening in which a tube $C'$ is fitted, and is provided with one or more perforations $c$, through which fluid may pass upwardly. The tube $C'$ is closed at the bottom and its function is to form a guide for a float D, which is used in the regulator. This float consists of a plate-like portion $d'$ and a central tubular portion $d^2$, which fits in the tube $C'$ and is guided thereby. The plate-like portion $d'$ at its circumference fits the cylindric portion of the chamber B loosely enough to enable it to work freely therein. In consequence of its fitting thus loosely fluid will pass between its edges and the chamber. The upper extremity of the central tubular portion $d^2$ of the float D constitutes a valve which operates in connection with a valve-seat $a$, formed adjacent to the outlet $a^2$. In the chamber B is a hole $b$, through which fluid may pass from said chamber into the space between the chamber and the body of the regulator. The freedom with which fluid will pass through said hole $b$ may be regulated by a screw $b^2$, fitted to the part $A'$ of the regulator-body. The fluid, when its pressure is in excess of the normal, will raise the float D and cause its valve to more or less close the outlet $a^2$. After the pressure is reduced to the normal the float will resume its ordinary position. The area of the hole or holes $c$ in the diaphragm C is in the aggregate to correspond as nearly as possible with the area of the annular space between the plate-like portion $d'$ of the float D and the cylindric portion of the chamber B. This is a feature of vital consequence, because by adopting this construction I am enabled to avoid fluttering of the float and its valve.

The regulator of Fig. 2 is also intended for an upward flow of the fluid. Its body is composed of two parts A' A², corresponding substantially with the two parts forming the body of the regulator illustrated in Fig. 1 and provided with a similar inlet and outlet. The lower part A' of the body of this regulator has a fixed diaphragm C', which is provided with a hole or holes $c'$. This diaphragm, as here shown, is formed integral with a circular shell $a^3$, that extends upwardly from the lower part A' of the regulator-body adjacent to the inlet $a'$. Above the diaphragm is a cylinder $a^4$, which, as here shown, is hollow. B designates a chamber similar to the chamber B. (Illustrated in Fig. 1.) As here shown, it is made separate from the regulator-body and attached to the shell $a^3$, in the present instance, by being screwed upon the same. The float D consists of a plate-like portion $d'$ and a tubular portion $d^2$, the latter fitting around the cylinder $a^4$ and being guided thereby. The upper end of the tubular portion of the float forms a valve which operates in connection with a valve-seat $a$. The shell $a^3$ is provided with a port $b^3$, through which fluid may pass to the space within the regulator-body outside of the chamber B. The flow of the fluid through the port $b^3$ may be regulated by means of a screw $b^2$, fitted in the part A' of the regulator-body. The area of the hole or holes $c'$ in the aggregate substantially corresponds to the area of the annular space between the plate-like portion $d'$ of the float D and the cylindric portion of the chamber B, with the same result as that already set forth with reference to the corresponding parts of the apparatus shown in Fig. 1.

In Fig. 3 I have shown another regulator adapted for an upward flow of fluid. Its body consists of two detachably-connected parts A' A². From the lower part A' extends upwardly a circular shell $a^5$, which, as here shown, is conical at the lower part and cylindrical at the upper part. The upper cylindric part of the shell $a^5$ constitutes the chamber B. The lower conical part of the shell $a^5$ is provided with a number of ports $a^6$. Fluid from the inlet $a'$ will pass through the ports $a^6$ to the space between the regulator-body and the upper part of the shell $a^5$, forming the chamber B. In the shell $a^5$, just above its conical portion, is a diaphragm C². This diaphragm is shown as being supported upon a shoulder formed at the junction of the conical and cylindric portions of the shell $a^5$. It is provided with one or more holes $c^2$. In the chamber B is a float D, consisting of a plate-like portion $d'$ and a tubular portion $d^2$. The upper extremity of the latter forms a valve coacting with the valve-seat $a$, arranged adjacent to the outlet $a^2$ of the regulator-body. The tubular portion $d^2$ of the float also forms a guide for the float by fitting a post C³, extending upwardly from the diaphragm C². The area of the hole or holes $c^2$ in the aggregate will correspond approximately with the annular space between the plate-like portion of the float D and the chamber B. The holes $a^6$ of the shell $a^5$ may be adjusted as to area by closing one or more of them or enlarging one or more of them by means of any suitable implements.

In Fig. 4 the body of the regulator consists of two parts A' A², the latter being a mere cap covering a cavity of the former. In this example of my improvement the inlet $a'$ and outlet $a^2$ are both formed in the lower part A' of the regulator-bottom and are arranged horizontally therein. Within the part A' is a shell forming a chamber B. In it is a port $b^5$, which allows of the passage of fluid from the inlet $a'$ to the space between the exterior of said chamber and the regulator-body. A screw $b^6$, fitted to the lower part A' of the regulator-body, may be adjusted to more or less obstruct the port $b^5$ to regulate the amount of fluid passing through said port. C⁴ is a diaphragm extending across the chamber B some distance below its top. As here shown, this diaphragm is formed integral with a cylindric flange or rim C⁵, which is fitted inside the chamber B, and so supports the diaphragm C⁴. This diaphragm is provided with an opening or openings $c^3$ for the flow of fluid to the chamber B. A passage is provided through which the fluid may issue to the outlet $a^2$. The diaphragm C⁴ is provided with a central tubular extension C⁶, which fits snugly into a tubular hub $a^7$, formed in the part A' and communicating with the outlet $a^2$. The float D consists of a plate-like portion $d'$ and a tubular portion $d^2$, the latter of which fits inside and is guided within the tubular extension C⁶ of the diaphragm. The upper extremity of the tubular portion $d^2$ constitutes a valve coöperating with the under side of the cap A², which forms a valve-seat $a$. The area of the opening or openings in the diaphragm C⁴ in the aggregate corresponds approximately with the annular space between the edge of the plate-like portion of the float D and the inner surface of the chamber B.

In Fig. 5 I have shown a regulator intended for a downward current of fluid. The body of the regulator consists of two parts A' A². The part A' has a cylindric portion $a^8$, which, at the upper end, has an opening to which is fitted the part A², the latter being made in the form of a removable cap. From the cylindric portion $a^8$ of the part A' a sinuous conduit $a^9$ extends, and this conduit at the upper end terminates in an inlet $a'$, which is above and concentric with the cylindric portion $a^8$. Within the cylindric portion $a^8$ of the part A' of the regulator-body is a chamber B, here shown as consisting of a shell formed integral with the said part A'. Within this chamber B is a concentric tubular hub $a^{10}$, which, at the lower end, communicates with an outlet $a^2$. A diaphragm $C^6$ extends across between the tubular hub $a^{10}$ and the chamber B and forms the bottom of the chamber. As here shown, this diaphragm has at the outer and inner circumferences downwardly-extending flanges which respectively fit against the exterior of the tubular hub and the interior of the chamber B. D designates a float consisting of a plate-like portion $d'$ and a tubular portion $d^2$, the latter extending within and being guided by the cylindric hub $a^{10}$. The upper extremity of the tubular part forms a valve which operates in connection with a valve-seat $a$, consisting of the under side of the cap or part $A^2$. In the diaphragm $C^6$ is a hole or a series of holes $c^4$, and the aggregate area of the same is substantially identical with the area of the annular space between the edge of the float and the interior of the chamber B. The lower part of the chamber is provided with a port $b^7$, through which fluid may pass to the space between said chamber and the body of the regulator. The passage of the fluid through this port may be regulated by a screw $b^8$.

Fig. 6 illustrates a regulator designed for an upward flow of fluid. Its body consists of a part A' and a part $A^2$. The part A' has a cylindric portion $a^{10}$, at the lower end of which is an inlet $a'$. A sinuous conduit $a^{11}$ extends from the cylindric portion $a^{10}$ and terminates at the upper end in an outlet $a^2$, which is above and concentric with the cylindric portion $a^{10}$. The part $A^2$ is made in the form of a cap detachably connected with the part A' above its cylindric portion $a^{10}$. Within the cylindric portion $a^{10}$ of the part A' is a chamber B. (Here shown as consisting of a cylindric shell.) The bottom of this chamber B is formed of a diaphragm $C^7$, extending between the interior of the chamber and the tubular hub $b^{12}$, with which the part A' of the regulator-body is provided. In this diaphragm $C^7$ is a hole or a series of holes $c^5$, through which fluid is admitted to the chamber. The area of the hole or series of holes in the diaphragm $C^7$ in the aggregate corresponds, approximately, with the area of the annular space between the edge of the plate-like portion of the float D and the inner surface of the chamber B. D designates a float consisting of a plate-like portion $d'$ and a central tubular portion $d^2$. The tubular portion $d^2$ fits within the tubular hub $b^{12}$. The upper extremity of the tubular portion of the float constitutes a valve which operates in conjunction with a valve-seat consisting of the under surface of the cap or part $A^2$. The shell forming the chamber B is provided with a port $b^9$, through which fluid may pass to the space between the chamber B and the body of the regulator. A screw $b^{10}$ affords provision for regulating this flow.

In Fig. 7 is a regulator which is intended for a downward flow of fluid. Its body consists of two parts A' $A^2$, detachably connected together. The part A' has an inlet $a'$ and the part $A^2$ an outlet $a^2$. The part A' comprises a chamber B, which may be made of a separate piece fitted into the part A' and extending almost to the part $A^2$. As here shown, this chamber is fastened by screws $a^{13}$ to lugs $a^{14}$, extending from the part A' of the regulator-body. It will be seen that there is a space within the part A' of the regulator-body outside of this chamber. The part $A^2$ has a tubular hub $a^{15}$ above the outlet $a^2$. $C^8$ is a diaphragm made in the form of a cylindric shell extending between the chamber B and the part $A^2$ of the regulator-body. As here shown, it is made separate from the part $A^2$ of the regulator-body and fitted therein; but it might be formed integral therewith. It is represented as extending into the chamber B and forming the inner surface of the lower portion of such chamber. The chamber B is provided with a port $b^{11}$, which may be partly or wholly closed by a screw-valve $b^{12}$, whose stem is fitted to the part A' of the regulator-body. Through this port fluid passes from the part A' of the regulator-body into the upper part of the chamber B. Fluid also passes through a hole or a series of holes $c^6$ in the diaphragm $C^8$ into the lower part of the chamber B. Within the chamber B is fitted a float D, consisting of a plate-like portion $d'$ and a central tubular portion $d^2$. The upper extremity of the latter forms a valve coöperating with a valve-seat $a$, consisting of the upper part of the chamber B. The lower extremity of the tubular portion $d^2$ works within a cylindric hub $a^{15}$, with which the part $A^2$ of the regulator-body is provided. The area of the hole or series of holes $c^6$ in the diaphragm $C^8$ aggregates, approximately, the area of the annular space between the plate-like portion of the float and the inner surface of the chamber B.

It will be seen that in every one of the illustrated examples of my improvement the fluid acts upon both sides of the float, and in its flow to that side of the plate-like portion of the float upon which it acts to close the valve it passes through a hole or a series of holes whose area in the aggregate corresponds substantially with the area of the space or passage-way between the circumference of the plate-like portion of the float and the interior of the chamber within which the float works. What I mean by "substantial correspondence" in this connection is a correspondence near enough to effect the desired object, which is to obviate fluttering or rapid up and down movements of the float and restrict the float to the movements which are necessary for the proper actuation of the valve. This is the essential feature of my invention and obviously may be embodied in regulators of construction differing widely from any of those illustrated.

My improvement involves the use of constant openings, or, in other words, openings which do not vary the operation of the regulator.

What I claim as my invention, and desire to secure by Letters Patent, is—

1. In a fluid-regulator of the class described, the combination of a chamber of general supply, a second chamber, a diaphragm extending between the chambers, a float in the second chamber and a valve actuated by the float, the diaphragm having an opening or openings below the float the area of which in the aggregate corresponds substantially to that of the opening between the edges of the float and the adjacent walls of the chamber, substantially as specified.

2. In a fluid-regulator, the combination of a chamber, a float, a valve actuated by the float and a diaphragm provided with an opening or openings located below the float, the said opening or openings having an area which in the aggregate corresponds substantially with the annular space between the walls of the diaphragm-chamber and the float, substantially as specified.

3. In a fluid-regulator of the class described, the combination of a chamber of general supply, a float, a valve, a chamber containing said float and valve and having a wall beneath said float, said wall consisting of a diaphragm provided with an opening or openings, the aggregate area of which corresponds substantially to that of the annular space between the walls of the diaphragm-chamber and the float substantially as specified.

In testimony whereof I have signed my name to this specification in the presence of two subscribing witnesses.

THOMAS GORDON.

Witnesses:
C. R. FERGUSON,
S. O. EDMONDS.